Feb. 10, 1931.  G. SHULMAN ET AL  1,792,127
MIRROR
Filed March 7, 1930
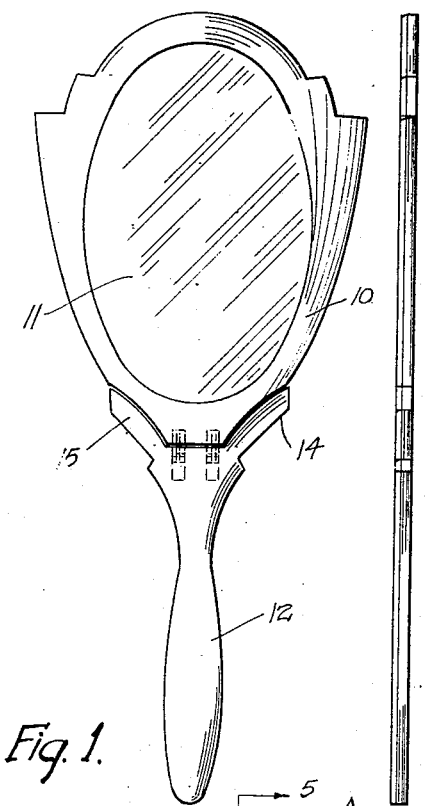
Fig. 1.
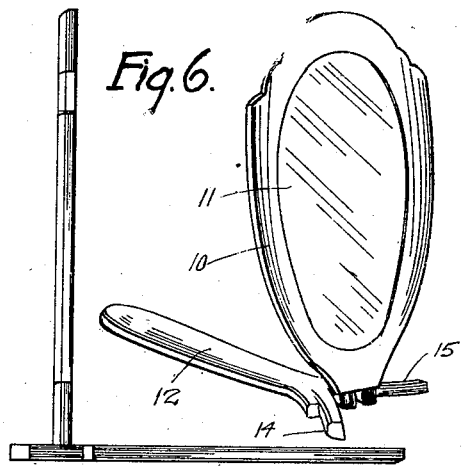
Fig. 6.
Fig. 3.
Fig. 2.
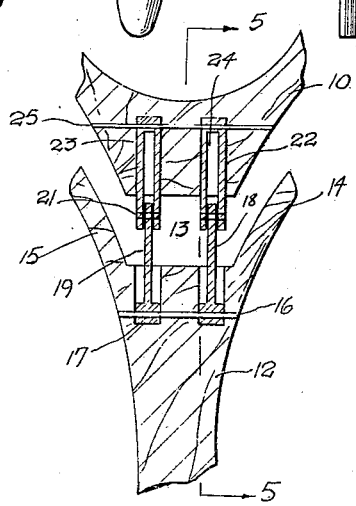
Fig. 4.
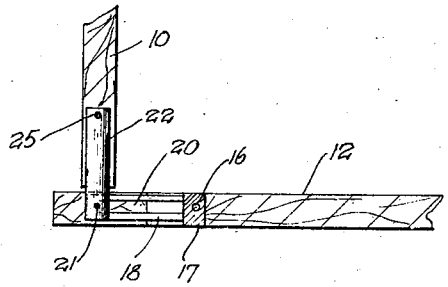
Fig. 5.
Inventors
Milton Alkan
Gilbert Shulman
By their Attorney
George C. Hennick Patented Feb. 10, 1931

1,792,127

UNITED STATES PATENT OFFICE

GILBERT SHULMAN AND MILTON ALKAN, OF NEW YORK, N. Y.

MIRROR

Application filed March 7, 1930. Serial No. 434,092.

This invention relates to improvements in mirrors, and particularly to a hand mirror, the handle of which can be used as a support for the mirror allowing its use as a stand mirror, if desired.

It is the principal object of our invention to connect handle and mirror frame in such manner that by simple manipulations the handle can be set at an angle of 90° to the mirror frame proper so as to form a firm support for the mirror if it is to be used as a stand mirror.

Another object of our invention is the provision of a mirror which may be used with equal facility as hand and stand mirror and is of simple and therefore comparatively inexpensive construction yet durable and efficient in operation.

With these objects in view our mirror comprises a mirror proper and its frame to the lower end of which longitudinally slotted prongs are attached and into the slots of which engage longitudinally slotted bars projecting from the upper recessed handle part, said prongs and bars being arranged at an angle of 90° to each other, and pins on the prongs about which the bars of the handle are pivoted limit the outward extensible movement of the handle while the outer faces of the handle extensions which form the aforementioned recess therebetween, act as supports for the mirror when the handle is used as a stand for the mirror.

Further objects and advantages of our invention will become more fully known as the description thereof proceeds, and will then be specifically defined in the appended claims.

In the accompanying drawing forming a material part of this disclosure:

Fig. 1 is a front elevation of a mirror constructed according to our invention.

Fig. 2 is an edge view thereof.

Fig. 3 is an edge view of the mirror when used as a stand mirror.

Fig. 4 is a fragmentary sectional view of the mirror illustrating the connection between mirror proper and its handle allowing a use of the mirror as a hand and stand mirror.

Fig. 5 is a section on line 5—5 of Figure 4 with the mirror set up as a stand mirror.

Fig. 6 is a fragmentary perspective view of the mirror when used as a stand mirror.

As illustrated, the mirror constructed according to our invention comprises the usual frame 10 in which the glass 11 is set in the usual well known manner, and which may be made of celluloid or any other suitable material ornamented or plain and colored to suit. A handle 12 is provided of any convenient suitable shape.

The handle has its upper end recessed as at 13 to conform to the shape of the lower end of the mirror proper, and the recess 13 is formed by two upwardly directed and laterally inclined extensions 14, 15 forming supporting feet if the mirror is used as a stand mirror.

A cross-bar 16 in handle 12 has attached thereto the heads 17 at the lower ends of two upwardly directed bars 18 and 19, laterally and longitudinally slotted as at 20 the upper ends of which are pivotally connected by means of cross-pins 21 between the open lower ends of two prongs 22, 23, slotted in the direction of their longitudinal axes, as at 24, the slots in which are arranged at an angle of 90° to the slots 20 in bars 18, 19.

The upper ends of prongs 22, 23, are secured in the mirror frame 10 to a cross bar 25 therein.

The operation of our device will be entirely clear from the above description and by simultaneous inspection of the drawing and it will be evident that an inwardly directed movement of handle 12 from the position shown in Figure 4 will displace pins 21 in slots 20 till they reach the lower ends of these slots, and will bring telescope bars 18, 19 into slots 24 of prongs 22, 23, until the extensions 14, 15 of the handle will firmly engage the lower end of the mirror frame 10 so as to hold handle and mirror in alignment and to enable the use of the mirror as a hand mirror.

If it is now desired to use the mirror as a stand mirror, an outwardly directed pull on handle 12 will bring the parts into the position shown in Figure 4 so that now the handle can be turned at an angle of 90° to the mirror proper about pins 21 to assume the position illustrated in Figures 3, 5, and 6, in which the extensions 14, 16 act as feet and engage with their flat front faces a support such as a table and firmly support the mirror as a stand mirror.

It will be understood that we have described and shown the preferred form of our device as one example only of the many possible ways to practically construct the same, and that we may make such changes in its construction as come within the scope of the appended claims without departure from our invention.

Having thus described our invention what we claim as new and desire to secure by Letters Patent is:

1. In a combination hand and stand mirror, a frame for the mirror glass having a lower restricted end, a handle, outward flaring extensions on the upper end of said handle forming a recess for the reception of the lower end of said mirror frame, slotted prongs projecting from the lower end of said frame, inner heads thereon, and a transverse pin in said frame for holding said heads in place, slotted bars projecting from the recess of said handle, heads on the inner ends of said bars, and a second transverse pin in said handle to which the heads of said bars are attached, pivot pins in the prongs of the frame, said pivot pins adapted to slide in the slots of said bars and allowing an engagement of mirror frame and handle for use of the mirror as a hand mirror and a limited disengagement for allowing the turning of the handle at an angle to said frame for acting in conjunction with said handle extensions and support for allowing the use of the mirror as a stand mirror.

2. In a combination hand mirror and stand mirror, a connection between handle and frame comprising a pair of slotted prongs at the lower end of said frame, a pair of slotted bars at the upper end of said handle, the slots in said prongs and the slots in said bars being at an angle of 90° to each other, pins on said prongs to which are pivoted the outer ends of said bars, said pins being adapted to slide in the slots of said bars, said bars sliding in the slots of said frame prongs, when the handle is moved into snug engagement with said frame, said bars also limiting the outward movement of said handle and allowing a turning of the same at an angle to said mirror frame, and extensions on said handle acting as support of the mirror with the handle in angular position to the frame if the mirror is to be used as a stand mirror.

Signed at New York, in the county of New York and State of New York, this third day of March, A. D. 1930.

GILBERT SHULMAN.
MILTON ALKAN.